G. M. ANDERSON.
DRIVE FOR MACHINERY.
APPLICATION FILED DEC. 19, 1917.
1,355,522.
Patented Oct. 12, 1920.
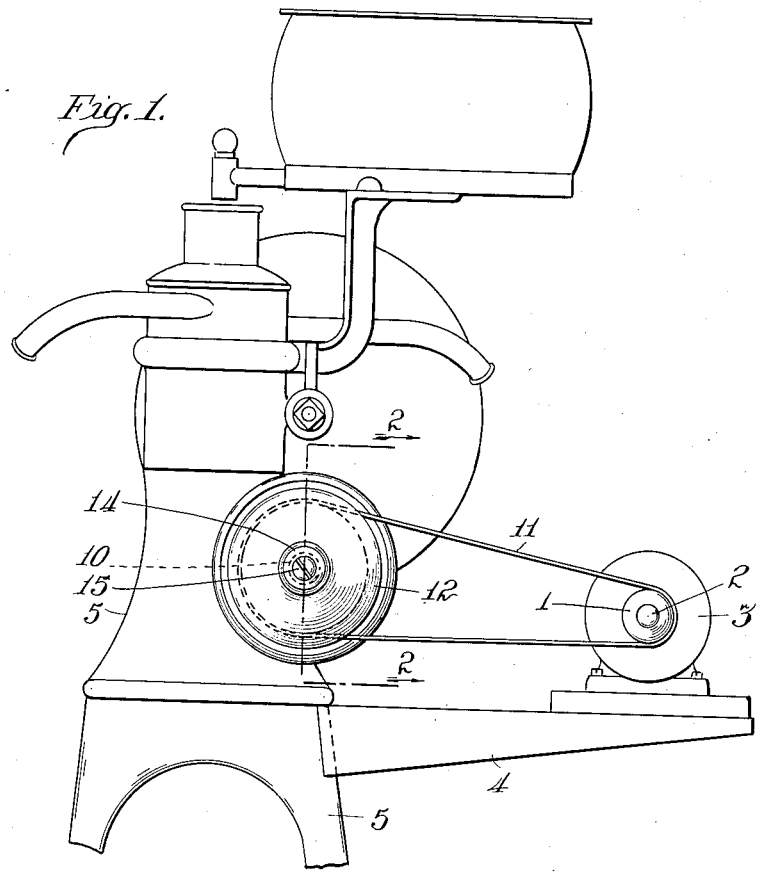
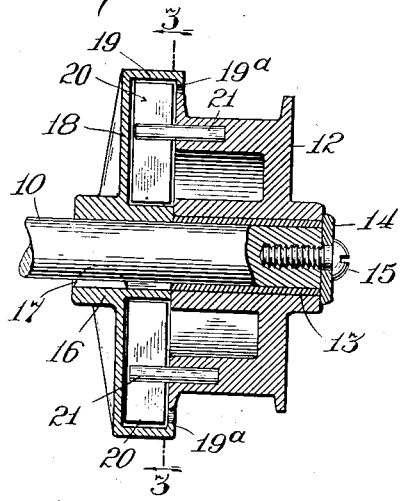
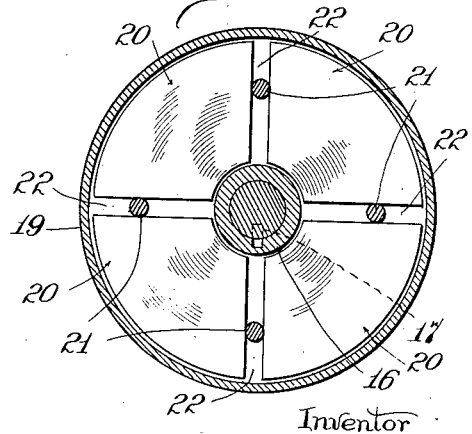
Inventor
Gustaf M. Anderson
Attorney

UNITED STATES PATENT OFFICE.

GUSTAF M. ANDERSON, OF WATERLOO, IOWA, ASSIGNOR TO IOWA DAIRY SEPARATOR COMPANY, A CORPORATION OF IOWA.

DRIVE FOR MACHINERY.

1,355,522.  Specification of Letters Patent.  Patented Oct. 12, 1920.

Application filed December 19, 1917. Serial No. 207,848.

*To all whom it may concern:*

Be it known that I, GUSTAF M. ANDERSON, a citizen of the United States, residing at Waterloo, in the county of Blackhawk, and State of Iowa, have invented certain new and useful Improvements in Drives for Machinery, of which the following is a full, clear, and exact description.

My invention relates to improvements in drives for machinery and has for its object to produce a drive that will automatically enable the prime mover, as for example an electric motor to impart its movement through suitable driving means as belt or gearing to machinery having parts that run at relatively high speed, which speeds are obtained by intermediate gearing or other speed multiplying devices as found for example in cream separators.

My invention relates more specifically to an improved form of centrifugally operated friction clutch that may be interposed between a positively operated driving unit or motor and gearing or other speed multiplying devices of relatively high speed machinery and more particularly adapted for use in gear driven cream separators.

Other objects of the invention will appear from the following description of the most approved form of the invention and shown also in the drawings and pointed out more particularly in the appended claims.

In carrying out my invention I preferably attach a bracket to the separator main frame and place the motor or other driving unit thereon. A driving belt is preferably passed over the moving pulley which is mounted to rotate freely on one of the drive shafts of the separator or other machine or in such close proximity to such shaft that it may to the extent desired impart its movement to such shaft. It is well known that in the use of electric motors and particularly of small sizes of motors the armatures or driving shafts thereof would not be effective or capable of starting the gearing of high speed machines when coupled directly thereto. For this reason it is common to employ friction clutches, hand operated, by which the torque exerted on the armature and motor shaft will be effective to start the motor and the driving belt and a part of the clutch mechanism, and after the motor has attained a given speed the friction clutch may be operated so as to cause the parts of the clutch to engage frictionally, and cause the machine to be gradually brought up to the speed of the motor. In known devices of this character the attention of an operator is required to operate the clutch into proper engagement and to regulate the amount of drag, pull or friction which the clutch shall exert upon the machine, for it will be obvious that careful control must be exercised or the electric motor may be stalled before the machine is brought up to speed. To attain these results I employ a centrifugally operated clutch, inoperative or very nearly so at very low speeds, and then after a predetermined speed is passed exerting a gradually increasing amount of drag or pull upon the machine to be brought up to speed, until finally a predetermined speed of both clutch and machine shall be reached, where the power of the motor shall be positively or almost positively transmitted to the machine.

In the said drawings Figure 1 is a view of a centrifugal separator in elevation showing the preferred manner of attaching the motor and driving connections to the usual operating mechanism of the machine. Fig. 2 is a broken detail view partly in section, showing the details of the clutch mechanism, and Fig. 3 is a detail section taken on line 3—3 of Fig. 2.

Referring more particularly to the drawings, 1 is a drive pulley which may be considered to be directly connected to a prime mover such as an electric motor, the shaft of the motor being designated by the reference character 2, and the motor frame as 3, the latter being preferably, adjustably secured to the bracket 4, which projects laterally from the main frame 5 of the centrifugal separator being preferably attachable thereto in order to avoid any special construction of separator main frame in order to accommodate the attachment of the driving mechanism of the invention. The shaft 10 of the machine projects from the gear casing of the separator and is preferably elongated beyond the outer edge of the casing, as shown in Fig. 2, to accommodate the attachment thereto of a suitable drive pulley or clutch mechanism which is connected to rotate with the driving pulley 1 of the motor by a flexible belt connection designated by the reference character 11, which passes also over the grooved or flanged driven pulley 12, mounted to rotate loosely upon the extreme outer end of the shaft 10, or upon a bushing designated by the reference character 13 interposed between the shaft and the loose pulley 12, being retained in position on said shaft or its bushing by a suitable locking device as the plate 14, the latter retained in position on the shaft by the end screw 15.

It will be apparent that the shaft 10 being one of the shafts of the machine, is geared positively to the driving mechanism and speed multiplying devices thereof such as the usual train of gears or the combination of worm and gear mechanism for imparting the high velocity, particularly to the bowl spindle, as is common in centrifugal machines. Interposed between the machine casing and the loose driven pulley 12 is a clutch casing having a hub portion 16, which is keyed as indicated at 17 or otherwise securely fastened to the shaft 10 to rotate therewith. The clutch casing is extended radially from the hub 16 as indicated at 18, Fig. 2, and at its outer periphery there is formed a relatively wide flange at approximately right angles to the radial portion 18 thereof, and approximately concentric to the hub portion 16, this flange being designated by the reference character 19, the latter having at its outer extremity on the side adjacent the loose driven pulley 12 a small retaining flange designated in Fig. 2 by the reference character 19$^a$. This supplementary flange 19$^a$ serves the particular function of retaining any lubricant that may be desired to be used in the clutch as the same will find its way to the outer periphery by reason of the centrifugal force generated by the clutch as its speed is increased. The flange 19$^a$ may also to an extent serve as a guide for the centrifugal friction blocks of the clutch, although these may be and are also retained in position by the proximity of the adjacent parts of the loose pulley 12.

It will be seen that the hub portion 16 and the radial and flange portions of the clutch casing 18 and 19, comprise a housing between the hub and outer flange portions of the clutch member which is circular in form, and I utilize the same as a path or groove around which suitable friction blocks as designated by the reference character 20 (Figs. 2 and 3) may freely travel at low speeds under the impelling force of pins 21 or other suitable device connected to rotate with the loose pulley 12.

In the embodiment of the invention shown the friction blocks 20 are formed preferably of solid metal, the metal to be used therein being determined by the amount of frictional force to be exerted by each block which obviously will vary according to the material employed and to the speed at which the clutch must rotate. The friction blocks 20 are preferably constructed as shown in Figs. 2 and 3 in the form of quadrants, that is, each block is of a size to occupy about ninety degrees of the circumferential groove in the clutch casing, and I have found that where the shaft 10 is steel the bushing 13 may advantageously be constructed of brass or other soft metal having desirable lubricating qualities, and that the loose pulley 12 may be made of steel or cast iron, while the adjacent clutch casing constructed integrally with the hub portion 16, on account of its contour, I preferably construct of cast iron. Likewise the friction blocks 20, I have found may be made of steel or cast iron, preferably of metal not harder than the material of which the clutch casing is made, since obviously, it will be easier to replace in case of wear the friction blocks 20 than the clutch casing itself. The quadrant shaped friction blocks 20 are preferably of a size so that when all of the blocks are in position in the casing there will be suitable spaces within the adjacent blocks, as indicated at 22, Fig. 3, so that when the parts of the driving mechanism are assembled the pins 21 will each be in position in the space 22 between the adjacent quadrant shaped friction blocks 20. I have found that cast iron is the material to be preferred in the friction blocks 20, since it is easily worked and wears well. I find that the friction blocks 20 must be adjusted as to weight with a certain amount of delicacy dependent upon the speed at which the device is to be used and the amount of friction to be exerted under a given condition. When cast iron is used portions thereof may be drilled out when desired and heavier or lighter material inserted at a small expense and without deteriorating the wearing portions of the friction blocks, and in this manner the pulling or clutching power of the device may be adjusted or determined to a very fine degree of adjustment.

As will be apparent from the preceding description of the construction of the driving mechanism when the driving shaft 10 of the machine is at rest the shaft 2 of the motor and the driving pulley 1 thereon may be caused to rotate, and while relatively slow speed is maintained the loose pulley 12 carrying the pins 21 will be caused to rotate and will drag the friction blocks 20 around the circumferential groove in the clutch casing. As the speed of the loose pulley 12 increases, obviously, the speed of rotation of the friction blocks 20 will increase with the result that there will be a constantly increasing pressure exerted on the interior of the flange 19, on the outer periphery of the clutch member keyed on the driving shaft 10. When a given speed has been reached the friction exerted by the friction blocks 20 will start the rotation of shaft 10, slowly at first, but with a gradually increasing speed until the speed of the shaft 10 has attained the speed of the loose pulley 12, and the centrifugal friction blocks 20, when the pulley 12 and the shaft 10 will rotate in unison. Obviously, upon a sudden change in the speed of the loose driven pulley 12 there will be a tendency for the friction between the blocks 20 and the clutch member 16 to diminish with the result that the loose driven pulley 12 and the driving device connected with it may again move at a different or slower speed than the shaft 10 of the machine.

This driving mechanism is found to be entirely automatic when the frictional weights 20 are properly adjusted, which is a decided advantage in preventing the possibility of stalling the motor or throwing the drive belt by improper manipulation of the ordinary hand operated clutch mechanism when used in a machinery drive of the described character.

I claim:

1. The combination with a shaft to be driven, of a clutch member rigidly secured thereto and comprising a hub portion, a radially extending web portion integrally formed with the hub portion and a peripheral flange on the web portion concentric to the hub portion, a plurality of segmental frictional metallic blocks arranged to substantially fill the space between the hub and peripheral portions of the said clutch member, there being radial spaces between each of the said blocks, a pulley mounted to rotate loosely upon the shaft adjacent the frictional blocks in the clutch casing, the said pulley being adapted to substantially close the opening formed by the space in the clutch casing between the hub and peripheral portions containing the said frictional metallic blocks, and a plurality of pins rigidly secured to the pulley and projecting into the clutch casing and into the said spaces between the frictional metallic blocks therein.

2. The combination with a shaft to be driven, of a clutch member rigidly secured thereto and comprising a hub portion, a radially extending web portion formed on the hub portion and a peripheral flange on the web portion concentric with the hub portion, a plurality of segmental frictional metallic blocks arranged to substantially fill the space between the hub and peripheral portions in the said clutch member, there being radial spaces between each of the said blocks, a pulley mounted to rotate loosely upon the shaft adjacent the open side of the clutch casing, the said pulley being adapted to substantially close the opening formed by the space in the clutch casing between the hub and peripheral portions containing the said frictional metallic blocks, a plurality of pins rigidly secured to the pulley and projecting into the clutch casing and into the said spaces between the frictional metallic blocks therein, and means for rotatably securing the pulley on the shaft comprising the hub of the clutch casing and a member coöperating with the hub of the pulley opposite that end of the hub engaging the hub of the clutch casing, the said member being detachably secured to the shaft to be driven.

3. The combination with a shaft to be driven, of a clutch member rigidly secured thereto and comprising a hub portion, a radially extending web portion integrally formed with the hub portion and a peripheral flange on the web portion concentric to the hub portion, a plurality of segmental frictional metallic blocks arranged to substantially fill the space between the hub and peripheral portions of the said clutch member, there being radial spaces between each of said blocks, a pulley mounted to rotate loosely upon the shaft adjacent the frictional blocks in the clutch casing, the said pulley being adapted to substantially close the opening formed by the space in the clutch casing between the hub and peripheral portions containing the said frictional metallic blocks, and means for securing a loose engaging connection between the pulley and each of said frictional metallic blocks.

In testimony whereof I have signed my name to this specification, in the presence of three subscribing witnesses, December, A. D. 1917.

GUSTAF M. ANDERSON.

Witnesses:
W. C. JOHNSON,
ANNA M. MEADER,
JAS. M. HUBBARD.